UNITED STATES PATENT OFFICE 1,962,072

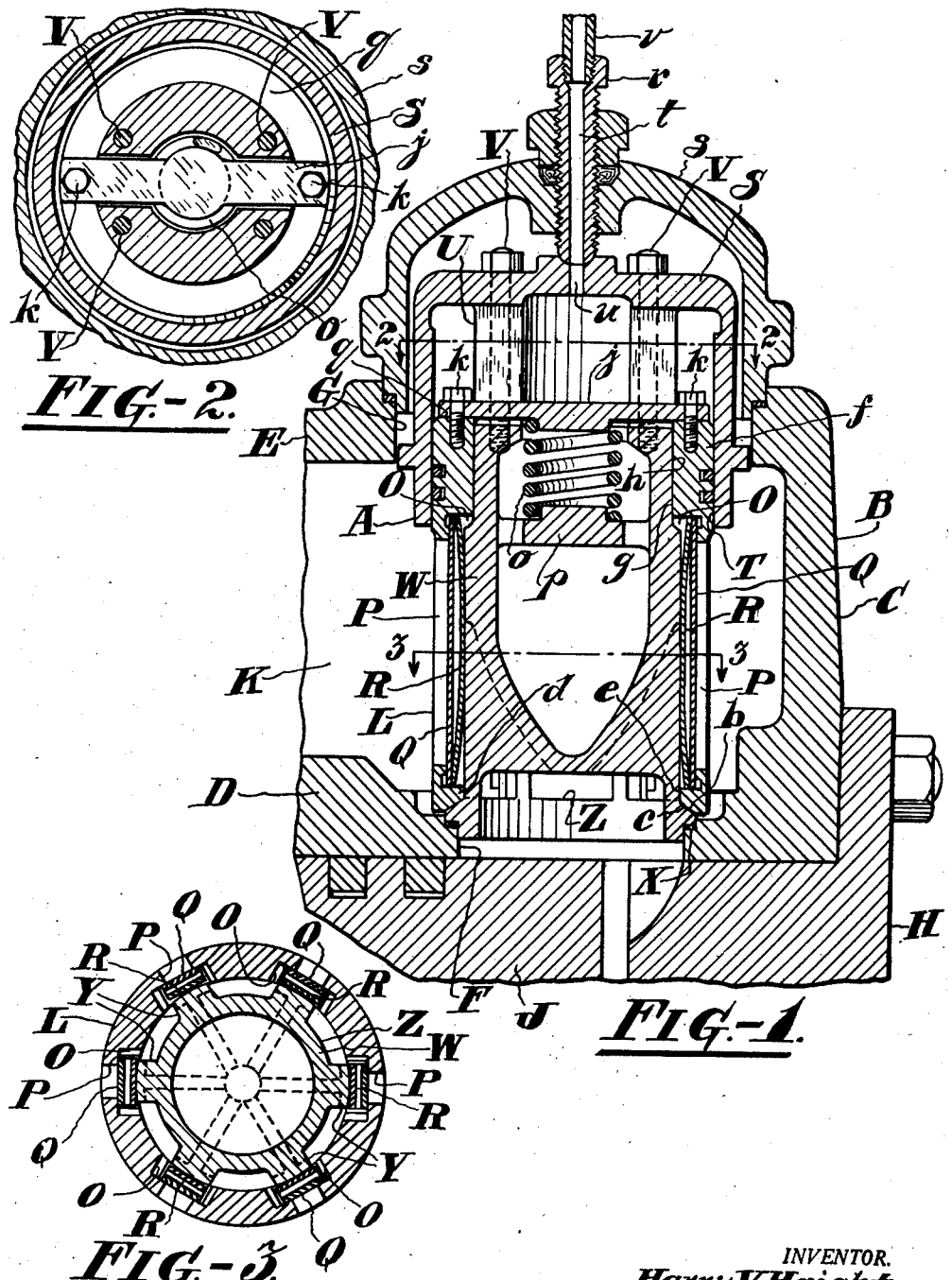

UNLOADER FOR COMPRESSORS

Harry V. Haight, Corning, N. Y., assignor to Ingersoll-Rand Company, Jersey City, N. J., a corporation of New Jersey Application June 6, 1932, Serial No. 615,608

5 Claims. (Cl. 137—153)

This invention relates to compressors, but more particularly to a compressor unloader adapted to unseat the inlet valve or valves of compressors whenever the pressure in the receiver, into which the compressor discharges, reaches a certain predetermined value.

One object of the invention is to effect unloading of the compressor by removing the valve mechanism from its normal operating position, thus permitting free communication between the compressing cylinder and the source of the working substance.

Other objects will be in part obvious and in part pointed out hereinafter.

In the drawing accompanying this specification and forming a part thereof and in which similar reference characters refer to similar parts, Figure 1 is a sectional elevation of a compressor unloader constructed in accordance with the practice of the invention and showing the unloader applied to a compressor, and Figures 2 and 3 are transverse views taken through Figure 1 on the lines 2—2 and 3—3 looking in the directions indicated by the arrows.

Referring more particularly to the drawing, the unloader, together with the valve mechanism which it controls, is designated in general by A, and B designates a compressor to which it is applied. Only a portion of a compressor cylinder C is shown, and said cylinder has a pair of spaced walls D and E wherein are formed coaxial apertures F and G, respectively, for the accommodation of the unloader and valve mechanisms.

The cylinder B has a suitable head H, and in the cylinder is a piston J for compressing the working substance conveyed thereto by the aperture F and a passage K between the walls D and E.

The valve mechanism employed for controlling the admission of working substance into the cylinder C, and which has been selected to illustrate a practical application of the invention, comprises a valve cage L, in this instance of generally cylindrical form, having a series of longitudinally extending slots O in its inner surface and ports P which extend from the periphery of the valve cage L to the slots. Within the slots O are valve plates Q in the form of strips of less width than the slots O to permit the passage of working substance from the ports P around the sides of the valve plates Q into the slots and thus into the interior of the valve cage L.

The slots O, moreover, accommodate springs R of the curved plate type arranged in the present instance to seat with their ends against the valve plates Q to maintain said valve plates seated over the ports P.

The unloader, constructed in accordance with the practice of the invention, comprises an unloader cylinder S of cup shape arranged in inverted position in the aperture G so that its open end T extends into or lies adjacent the passage K. Within the cylinder S are a pair of partly circular ribs U to which is secured, as by means of bolts V, an extension W which extends through the valve cage L and is provided at its innermost or free end with a shoulder X that seats upon the wall D of the cylinder C. In the periphery of the extension W are longitudinally extending ribs Y which act as seats for the intermediate portions of the springs R and are suitably spaced to define recesses or passages Z through which the working substance flows from the passage K to the compressing cylinder.

On the rear portion of the shoulder X is an inclined seating surface $b$ for the accommodation of a similarly inclined surface $c$ at the front end of the valve cage L. The surface $c$, in the present instance, is formed on the front end of an introverted flange $d$ on the valve cage and which flange is adapted to slide with its inner surface $e$ upon the ribs Y.

On the opposite end of the valve cage L is a piston $f$ of annular shape which is preferably an integral portion of the valve cage and lies within the unloader cylinder S wherein it is adapted to reciprocate. The inner surface $g$ of the piston $f$ also slidably engages a correspondingly formed surface $h$ on the extension W and adjacent the ribs U.

Disposed upon the free end of the piston $f$ is a spring seat $j$ in the form of a strip secured to the cylinder by means of screws $k$. The spring seat $j$ lies between the ribs U whereby it is guided for holding the piston $f$, and therefore the valve cage L, against rotary movement with respect to the extension W. A spring $o$ in the extension W acts with one end against the spring seat $j$ and is seated with its other end against a rib $p$ in the extension W.

The upper or free end of the piston $f$ constitutes a pressure area $q$ against which pressure fluid normally acts for retaining the valve mechanism in its normal operative position, that is, in a position wherein the surfaces $c$ and $b$ are in engagement with each other. The pressure fluid employed for this purpose may be introduced into the cylinder S by any suitable means. The means illustrated for this purpose comprises a hollow bolt *r* threaded into a cover plate *s* which acts as a closure for the aperture G.

The bolt *r* bears upon the cylinder S to lock the said cylinder and the extension W securely in fixed position. The passage *t* within the bolt registers with a passage *u* in the cylinder S for conveying pressure fluid to and from the cylinder S. Connected to the outer end of the bolt *r* is a conduit *v* which may lead from a storage receiver for supplying pressure fluid to the cylinder S.

Any suitable and well known valve means (not shown) may be interposed in the conduit *v* for automatically admitting pressure fluid into the cylinder S to normally hold the valve cage L firmly seated upon the surface *b* and to automatically exhaust such pressure fluid from the cylinder S whenever the pressure fluid therein reaches a maximum predetermined value which it may be desired to maintain.

During the normal operation of the compressor, as when the compressor is operating under full load conditions, pressure fluid admitted into the cylinder S through the passages *t* and *u* acts against the pressure area *q* of the piston *f* and holds the valve cage firmly seated upon the surface *b*. The spring *o* will then, of course, be compressed between the spring seats *j* and the rib *p*.

During the subsequent operation of the compressor the working substance flows from the passage K through the ports P in the valve cage, the passages Z and the aperture F into the cylinder where it is compressed by the piston J. This operation may continue until the pressure within the storage receiver into which the compressor discharges reaches the predetermined maximum value and the valve device hereinbefore referred to and which controls the admission and exhaust of pressure fluid into and from the cylinder S will then operate to exhaust the pressure fluid from the cylinder S, whereupon the spring *o* raises the valve cage L.

Direct and uncontrolled communication will then be established between the passage K and the compressing chamber so that the working substance will be merely pumped back and forth between the passage K and the cylinder.

The compressor may operate in this wise until the value of the pressure within the storage receiver drops sufficiently to cause the valve device in the conduit *v* to again admit pressure fluid into the cylinder S to move the valve assembly to its normal operating position.

I claim:

1. A compressor unloader, comprising an unloader cylinder, an extension affixed to the unloader cylinder, a valve cage slidable on and guided by the extension and having ports therein, valve plates to control the ports, a piston on the valve cage reciprocable in the unloading cylinder and having a pressure area adapted to be subjected to pressure fluid for actuating the valve cage longitudinally of the extension in one direction, and a spring for actuating the valve cage in an opposite direction.

2. A compressor unloader, comprising an unloader cylinder, an extension on and guided by the cylinder, a seating surface on the extension, a valve cage slidable on and encircling the extension and having ports therein, valve plates to control the ports, a piston on the valve cage lying in the unloader cylinder and having a pressure area against which pressure fluid acts for holding the valve cage seated upon the seating surface, and a spring for raising the valve cage from the seating surface.

3. A compressor unloader, comprising an unloader cylinder, an extension on the unloader cylinder having external longitudinally extending ribs, a valve cage having ports therein, an internal guide surface on the valve cage slidable on the ribs, valve plates to control the ports, springs for closing the valve plates and being seated upon the ribs, a piston on the valve cage reciprocable in the cylinder, means for actuating the piston relatively to the cylinder, and means in the cylinder for holding the piston against rotation with respect to the cylinder.

4. A compressor unloader, comprising an unloader cylinder, an extension affixed to the unloader cylinder and having an external shoulder, a valve cage slidable on the extension and having ports therein, valve plates to control the ports, a piston on the valve cage reciprocable in the cylinder and having a pressure area normally subjected to pressure fluid for maintaining the valve cage seated upon the shoulder, and a spring for lifting the valve cage from the shoulder.

5. A compressor unloader, comprising an unloader cylinder, an extension on the cylinder having longitudinally extending ribs, an external shoulder on the extension, a valve cage having ports therein and being slidable on the ribs, valve plates to control the ports, springs for closing the valve plates and being seated upon the ribs, a piston on the valve cage extending into the cylinder and having a pressure area subjected to pressure fluid for holding the valve cage normally against the shoulder, a spring seat on the piston, a spring acting against the extension and the spring seat to lift the valve cage from the shoulder, and guide means in the cylinder for the spring seat to hold the valve cage against rotary movement with respect to the extension.

HARRY V. HAIGHT.

CERTIFICATE OF CORRECTION.

Patent No. 1,962,072.  June 5, 1934.

HARRY V. HAIGHT.

It is hereby certified that error appears in the printed specification of the above numbered patent requiring correction as follows: Page 2, line 85, claim 2, strike out the words "and guided by"; and line 86, after "the" first occurrence insert unloader; and that the said Letters Patent should be read with this correction therein that the same may conform to the record of the case in the Patent Office.

Signed and sealed this 24th day of July, A. D. 1934.

Bryan M. Battey (Seal)

Acting Commissioner of Patents.